Figure 1:
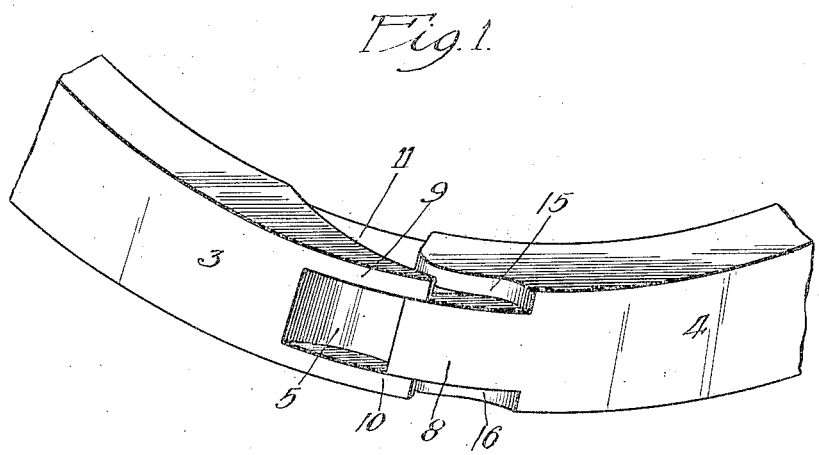

A. STERN.
PISTON RING AND THE LIKE.
APPLICATION FILED SEPT. 8, 1919.

1,350,849. Patented Aug. 24, 1920.

UNITED STATES PATENT OFFICE.

ADOLF STERN, OF CHICAGO, ILLINOIS, ASSIGNOR TO F. W. STEWART MFG. CO., OF CHICAGO, ILLINOIS, A CORPORATION OF ILLINOIS.

PISTON-RING AND THE LIKE.

1,350,849.   Specification of Letters Patent.   Patented Aug. 24, 1920.

Application filed September 8, 1919. Serial No. 322,517.

*To all whom it may concern:*

Be it known that I, ADOLF STERN, having declared my intention of becoming a citizen of the United States, residing at Chicago, Cook county, Illinois, have invented certain new and useful Improvements in Piston-Rings and the like, of which the following is a specification.

The present invention has to do with improvements in piston rings for use in pistons of engines, etc. One of the objects of the invention is to provide a piston ring construction of simple form and which can be cheaply manufactured, but which ring shall be so constructed that it will be very efficient in reducing or preventing the leakage of gas past the piston.

Another object in this connection is to so construct the piston ring that a wide latitude in variation of the diameter may be provided in the ring without materially changing the relationship of its end portions, so as to thereby insure a very efficient sealing action at all diameters.

Other objects and uses of the invention will appear from a detailed description of the same which consists in the features of construction and combinations of parts hereinafter described and claimed.

Figure 2:
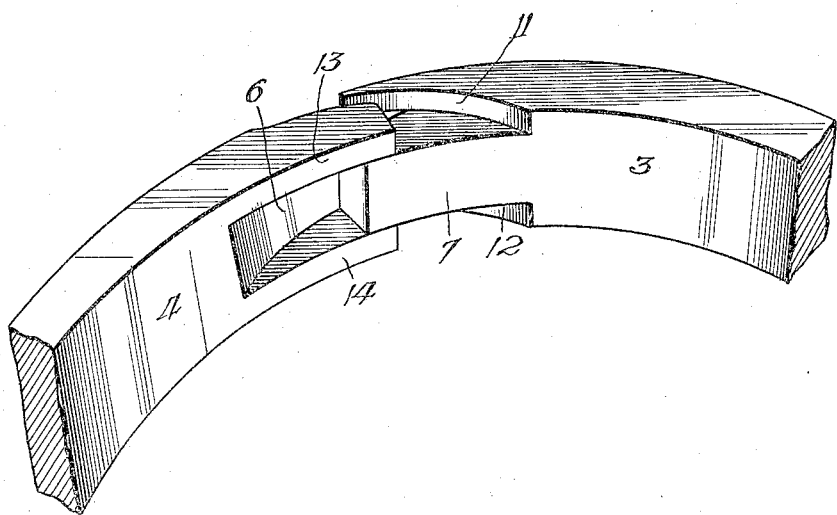

In the drawings:

Figure 1 shows a perspective outside view of the overlapping end portions of the piston ring; and Fig. 2 shows a perspective inside view corresponding to Fig. 1.

Referring to the figures, it will be observed that the end portions of the ring are designated by the numerals 3 and 4 respectively. The end portion 3 is provided with a notch or recess 5 on its outside face, and the end portion 4 is provided with a corresponding notch or recess 6 on its inside face. These notches or recesses complement each other in various directions, so that the projecting tongue portion 7 of the end 3 may work into the notch or recess 6, and the projecting end or tongue portion 8 of the end 4 may work into the notch or recess 5.

It will be observed that the side walls 9 and 10 at the sides of the notch 5 have their under edges or faces 11 and 12 curved on a concave curvature, whereas the side walls 13 and 14 at the sides of the recess 6 have their edges or faces 15 and 16 cut or formed on a convex curvature. The curvatures of these portions complement each other, as will be clearly evident from an examination of Fig. 2.

I wish to mention that the piston ring herein disclosed may be used either alone or in association with other similar piston rings, or in association with other piston rings of dissimilar form.

I claim:

1. As a new article of manufacture, a piston ring comprising a split ring of suitable material having its end portions lying adjacent to each other and adapted to coöperate with each other in the sealing function, one of said end portions having an exteriorly facing longitudinal recess, and the other of said portions having an interiorly facing longitudinal recess, the side portions of the end portions being cut away adjacent to said recesses in complementary fashion, whereby a tongue is provided on each end portion adapted to seat into the recess of the other end portion, and whereby the sides of the recesses provide a seal with respect to the tongues, substantially as described.

2. As a new article of manufacture comprising a split ring of suitable material having its portions adapted to coöperate with each other in the sealing function, one of said end portions having a longitudinally extending exteriorly facing recess, and the other of said end portions having a longitudinally extending interiorly facing recess, the side portions of the end portions of the ring being cut away to provide tongues on the end portions adapted to seat into and coöperate with the respective recesses, substantially as described.

ADOLF STERN.